United States Patent
Wilson et al.

(10) Patent No.: US 10,109,054 B1
(45) Date of Patent: Oct. 23, 2018

(54) MONITORING COTS DISPLAY DEVICES FOR HWD/HUD/EVS VIA TRANSPARENT PHOTODETECTORS AND IMAGERS

(71) Applicant: Rockwell Collins, Inc., Cedar Rapids, IA (US)

(72) Inventors: Brandon E. Wilson, Portland, OR (US); Eric P. Stratton, Portland, OR (US); David I. Han, Lake Oswego, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 87 days.

(21) Appl. No.: 15/214,065

(22) Filed: Jul. 19, 2016

(51) Int. Cl.
*G06T 7/00* (2017.01)
*G06T 19/00* (2011.01)
*G09G 5/36* (2006.01)
*G02B 27/30* (2006.01)
*G02B 27/01* (2006.01)
*H04N 5/33* (2006.01)

(52) U.S. Cl.
CPC ........ *G06T 7/0022* (2013.01); *G02B 27/0101* (2013.01); *G02B 27/0172* (2013.01); *G02B 27/30* (2013.01); *G06T 19/006* (2013.01); *G09G 5/36* (2013.01); *H04N 5/332* (2013.01); *G02B 2027/014* (2013.01); *G02B 2027/0138* (2013.01); *G09G 2370/16* (2013.01); *G09G 2380/12* (2013.01)

(58) Field of Classification Search
None
See application file for complete search history.

(56) References Cited

U.S. PATENT DOCUMENTS

2012/0194418 A1* 8/2012 Osterhout .......... G02B 27/0093
345/156
2016/0343288 A1* 11/2016 Kim ..................... G06F 3/14

OTHER PUBLICATIONS

Hui Zhang, et al.; "Transparent Organic Photodetector Using a Near-Infrared Absorbing Cyanine Dye"; Scientific Reports 5, 9439; DOI:10.1038/srep09439 (2015); pp. 1-6.
(Continued)

*Primary Examiner* — Edward Martello
(74) *Attorney, Agent, or Firm* — Angel N. Gerdzhikov; Donna P. Suchy; Daniel M. Barbieri

(57) ABSTRACT

Systems and a related method for monitoring commercial off the shelf (COTS) display devices in an avionics display system ensure that the COTS display devices are compliant with hazard classifications by positioning transparent photodetectors in the optical path to monitor the images and components generated and projected by the COTS display devices. Transparent photodetectors are positioned downstream in the optical path to monitor image orientation, refresh rate, or brightness of displayed images and image elements. The system may include transparent image sensors for capturing scene content and monitoring image integrity by comparing the captured scene content to the displayed images. Transparent image sensors positioned proximate to camera cores of an enhanced vision system (EVS) may verify the alignment of individual component image streams combined into an image stream displayed via HDD, HUD, HWD, or a like display element.

18 Claims, 5 Drawing Sheets

(56) References Cited

OTHER PUBLICATIONS

Alexander Koppelhuber, et al.; "Towards a Transparent, Flexible, Scalable and Disposable Image Sensor Using Thin-Film Luminescent Concentrators"; Optics Express 4796; vol. 21, No. 4; Feb. 25, 2013; 15 pages.

Andrew Davidson; "New Transparent, Flat, Flexible Image Sensor Has Potential for Gesture Control Displays"; http://www.gizmag.com/transparent-flat-flexible-image-sensor/26350/; Feb. 21, 2013; 3 pages.

Amit S. Pawbake, et al.; "Highly Transparent Wafer-Scale Synthesis of Crystalline WS2 Nanoparticle Thin Film for Photodetector and Humidity-Sensing Applications"; ACS Appl. Mater. Interfaces, 2016, 8 (5), pp. 3359-3365; http://http://pubs.acs.org/doi/pdf/10.1021/acsami.5b11325; Copyright 2016 American Chemical Society.

Paul Ridden; "Carbon Nanotube Solar Cells Point to Possible Transparent Solar Window Future"; http://www.gizmag.com/transparent-carbon-nanotube-solar-cell/21912/; Mar. 23, 2012; 3 pages.

Hui Zhang, et al.; "Transparent Organic Photodiodes"; Scientific Reports 2015, 5, 9439; https://www.empa.ch/web/s209/organic-photodiodes/-/journal_content/56_INSTANCE_StdArt/55926/198852?; 2 pages.

\* cited by examiner

MONITORING COTS DISPLAY DEVICES FOR HWD/HUD/EVS VIA TRANSPARENT PHOTODETECTORS AND IMAGERS

CROSS-REFERENCE TO RELATED APPLICATIONS

This application is related to U.S. patent application Ser. No. 14/814,020, filed on Jul. 30, 2015. Said U.S. patent application Ser. No. 14/814,020 is herein incorporated in its entirety.

BACKGROUND

Avionics display systems such as head-worn displays (HWD), head-up displays (HUD), and enhanced vision (EV) systems (EVS) may employ commercial off-the-shelf (COTS) display devices to reduce the high cost of custom display devices. However, the use of COTS devices lacking DO-254 design assurance may not provide sufficient integrity to maintain compliance with aviation hazard classifications. The conventional solution is the use of multiple independent monitoring schemes. For example, a HUD utilizing one or more COTS display devices may employ a first monitor to ensure that the display is not stuck, flipped, or otherwise generating a hazardously misleading image. A second monitor may ensure that a sudden "all white all bright" (AWAB) condition (or similar shift in brightness) will not incapacitate the pilot. Still another monitor may be employed to ensure that display graphics generators have not mispositioned or misaligned critical symbology merged to the displayed images. Historically, each of these various monitoring systems have been separately implemented using widely varied and complex methods.

If the HUDs and head-worn devices (HWD) of the future are to handle CAT 3 landing credit and low visibility operations (e.g., either with no decision height or a decision height lower than 100 feet (30 m) and a runway visual range not less than 700 feet (200 m)), size, weight, power, and cost (SWaP-C) considerations may mandate the use of COTS devices as opposed to expensive custom engineered displays. Consequently, similar mechanisms of display path monitoring may be required. EV systems, which employ complex COTS devices, provide additional challenges in camera core monitoring. For example, an EVS may have several independent camera cores, produced by a variety of vendors and each providing different scene content. Each core must be shown not to present a critically misaligned or misleading image, or the combined vision stream uniting the feeds of different camera cores may present a hazardously incoherent image. Conventional solutions, which involve matching dead pixels in the output images to known locations, are having trouble keeping up with the continually improving quality of EV systems.

SUMMARY

In one aspect, embodiments of the inventive concepts disclosed herein are directed to a system for monitoring the image integrity of COTS display modules in a HUD or HWD avionics display system. The system may include an image source for generating image streams displayed by the HUD/HWD. The system may include a graphics processor for generating symbology relative to the displayed images and merging the symbology into the image stream. The system may include collimating optics defining an optical path from the COTS display module to the display element or surface of the HUD/HWD. The system may include one or more transparent photodetectors or image sensors positioned in the optical path for capturing the generated image stream. The system may include a processor connected to the photodetectors for monitoring the brightness, orientation, or refresh rate of the generated image stream to be displayed by the display element.

In a further aspect, embodiments of the inventive concepts disclosed herein are directed to a system for monitoring the image integrity of COTS display modules in an EVS. The system may include a series of COTS camera cores, each core detecting EM radiation in specific spectral bands and each camera core generating a band-specific image stream associated with the detected EM radiation. The system may include display electronics for generating a combined image stream formed by combining the image streams generated by the camera cores and displaying the combined image stream via a HDD, HUD, HWD, or other display element. The system may include a series of transparent image sensors, each image sensor positioned proximate to a camera core for generating an image stream specific to the spectral bands of the corresponding camera core. The system may include a processing monitor connected to the transparent image sensors for generating control image streams and evaluating the alignment of the combined image stream by comparing the control image streams to the image streams generated by the transparent image sensors.

In a still further aspect, embodiments of the inventive concepts disclosed herein are directed to a method for monitoring COTS display devices in a HUD, HWD, EVS, or other avionics display system. The method may include generating an image stream via an image source. The method may include transmitting the generated image stream to a COTS display module via an optical path defined by collimating optics. The method may include detecting the generated image stream via transparent photodetectors or image sensors positioned in the optical path. The method may include evaluating the orientation, refresh rate, or brightness of the display unit via a monitor connected to the photodetectors or image sensors. The method may include displaying the generated image stream via a display element of the system.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
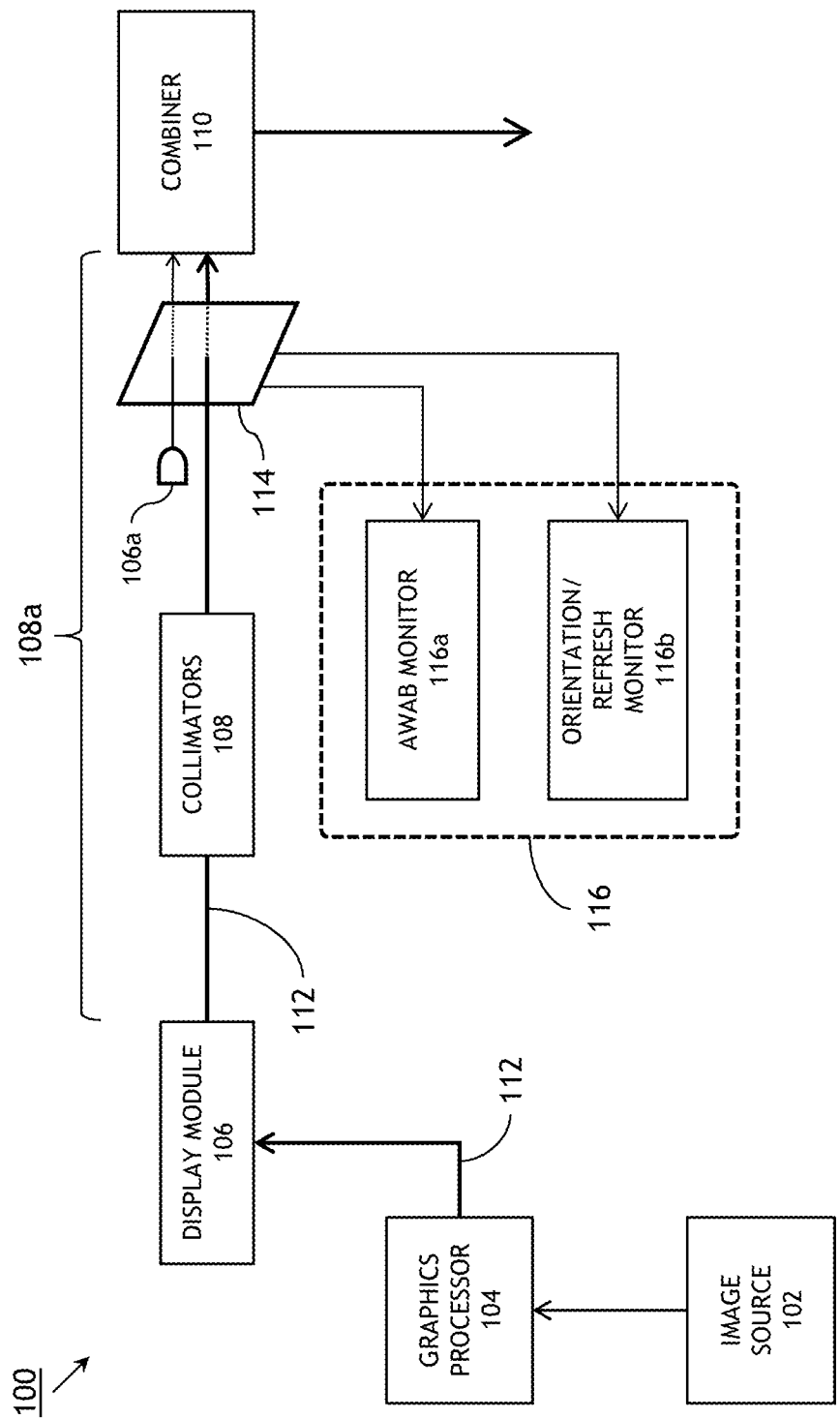
FIG. 1 illustrates of an exemplary embodiment of a system for monitoring COTS devices according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and related methods for monitoring COTS display devices in an avionics display system, whether that display system is a HUD, HWD, or EVS-based system. The cost of custom-engineered display devices utilizing COTS components may be reduced by providing built-in assurance of the image integrity via low size, weight, power, and cost (SWaP-C) devices. Embodiments of the inventive concepts disclosed herein may maintain the hazard compliance of cost-effective COTS display devices via the use of transparent photosensing technology, which may be compact enough to scale down to HUD and HWD applications yet sufficiently robust to monitor display devices of continually advancing quality, including multi-stream/multi-band EVS or CVS systems.

Referring to FIG. 1, an exemplary embodiment of an avionics display system 100 for may include an image source (image processor) 102, a graphics processor 104 (e.g., synthetic vision system (SVS)), one or more COTS display modules 106 such as a light-emitting diode (LED) illuminator or liquid crystal on silicon (LCoS) projector; and collimating optics 108 defining an optical path 108a from the display module 106 to a combiner 110 or other surface of a display element (e.g., a HWD microdisplay surface). The image source 102 may be connected to one or more externally mounted sensors for detecting EM radiation in, e.g., the visible, infrared (IR), or near-infrared (NIR) spectral bands. The image source 102 may then generate, based on the sensed EM radiation, images for display by the avionics display system 100, the display element of which may be a HUD or a HWD configured for specific pilot or crewmember. The avionics display system 100 may be a combined vision system (CVS) in which the symbology is generated by the graphics processor 104 (e.g., an aircraft horizon line or flight path vector) and merged into the output of the image source 102 to generate a combined image stream 112 for display by the HUD/HWD. The optical path 108a (optical chain) may be defined by collimating optics 108 connecting the display module 106 to the combiner 110.

The avionics display system 100 may monitor the COTS display module 106 (or one or more aspects of the combined image stream 112 displayed thereby) via transparent photodetectors 114 placed within the optical path 108a. It is contemplated that the transparent photodetectors 114 may be optimally positioned downstream in the optical path 108a (i.e., proximate to the combiner 110 or display surface), or beyond any point in the optical path wherein design failure could corrupt or adversely affect the integrity of the image stream 112 (or of any symbology included therein). The transparent photodetectors 114 allow detection or sensing of light within the optical path 108a without obscuring the combined image stream 112 presented to the pilot via the combiner 110. The transparent photodetectors 114 may include photodiodes or wavelength-specific materials for capturing image detail (e.g., a "dark" portion of the combined image stream 112 not associated with critical content) associated with a particular spectral band (for, e.g., visible-band, IR, or NIR imaging).

For example, the transparent photodetector 114 may be a single transparent camera or image sensor capable of detecting multiple geometric or wavelength specific features (e.g., image brightness, image orientation, image refresh rate, symbol positioning) and comparing those features to independently computed control features generated by an independent processing resource 116 connected to the transparent camera or image sensor. In some implementations, the system 100 may monitor the integrity of the displayed image via, e.g., an infrared (IR) or near-infrared (NIR) LED 106a or similar illuminator or emitter, the illuminator output specific to one or more wavelengths or spectral bands invisible to the pilot but detectable by the transparent photodetectors 114, combined with time phasing. For example, the processing resource 116 may provide phased processing for the generation, detection and confirmation of display refresh patterns. The NIR LED 106a may be positioned in the optical path 108a but outside the primary (e.g., visible-band) illumination path, using a predetermined imager pattern or area of the combiner 110 or display surface to test for image misalignment or refresh rate issues.

The avionics display system 100 may include one or more monitor processors 116 linked to the transparent photodetectors 114 for verifying specific display aspects of the COTS display devices 106 and the image stream 112 generated thereby. For example, an all white/all bright (AWAB) monitor (116a) may monitor the brightness of the combined image stream 112 to ensure that the pilot is not disoriented or incapacitated by sudden shifts in luminous intensity. An orientation monitor (116b) may verify that the combined image stream 112 (or any symbology integrated therein) is neither "flipped", e.g., presenting an inverted image stream, nor "stuck", e.g., improperly or insufficiently refreshing the displayed image stream, nor misaligned, e.g., with respect to multiple image streams portraying similar or identical scene content as viewed through different spectral bands. The presence of any one of these conditions could result in a hazardously misleading image.

Figure 2A:
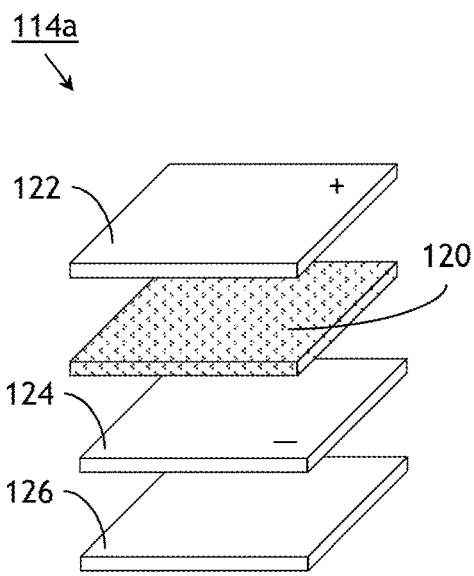
FIGS. 2A and 2B illustrate exemplary embodiments of transparent photodetectors, and FIG. 2C an exemplary embodiment of a transparent image sensor, of the system of FIG. 1.
Figure 2B:
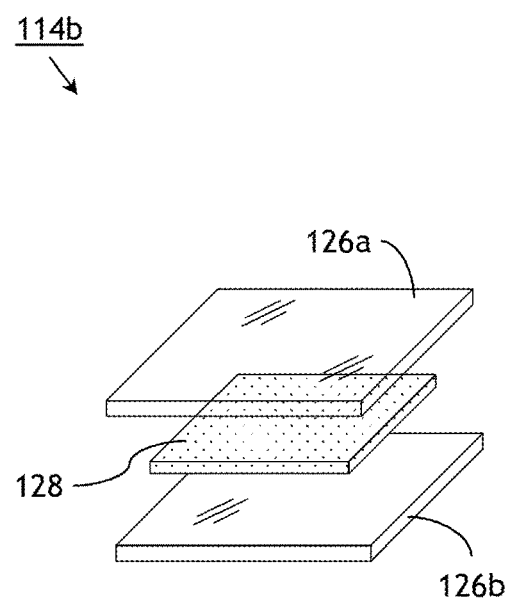
Figure 2C:
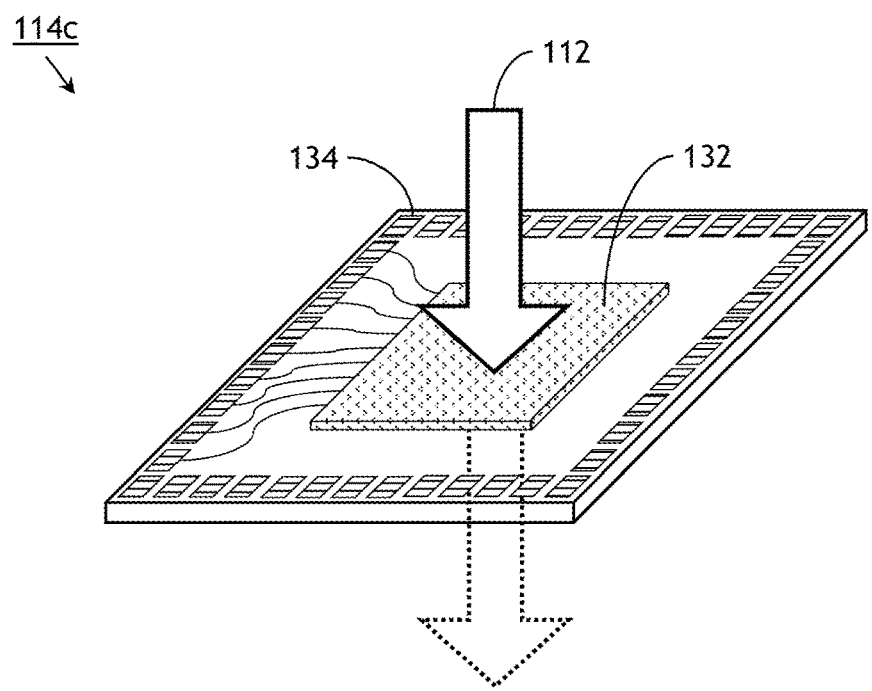

Referring to FIGS. 2A through 2C, several exemplary embodiments of the transparent photodetector 114 of the avionics display system 100 of FIG. 1 are shown. By way of a non-limiting example, the avionics display system 100 may incorporate multiple variations of transparent photodetectors 114a-b or transparent image sensors 114c depending on SWaP-C considerations or robustness requirements. Referring specifically to FIG. 2A, a transparent photodetector 114a may incorporate a wavelength-sensitive layer 120 comprising a photosensitive dye or material (e.g., a layer of cyanine dye capable of absorbing NIR radiation). For example, the avionics display system 100 may include an emissive display system incorporating multiple emissive devices or organic light-emitting diodes (OLED), wherein the wavelength-sensitive layer 120 is sandwiched between anode/hole transport layers (122) and cathode/electron transport layers (124) fixed to an electrically conductive glass substrate 126.

Referring specifically to FIG. 2B, a transparent photodetector 114b may be implemented and may function similarly to the transparent photodetector 114a of FIG. 2A, except that the transparent photodetector 114b may include a nanolayer 128 sandwiched between two conductive glass substrates 126a, 126b. The transparent photodetector may alternatively incorporate substrates of polymer film or any similarly appropriate material. The nanolayer may include photosensitive carbon nanotubes, thin-film tungsten disulfide ($WS_2$) nanoparticles, quantum dots, or other similar nanoscaled photosensitive materials.

Referring specifically to FIG. 2C, a transparent image sensor 114c may be implemented and may function similarly to the transparent photodetector 114b of FIG. 2B, except that the transparent image sensor 114c may include a luminescent concentrator (LC) 132 as an interior layer or sandwiched between transparent substrates. For example, the LC 132 may include a layer of transparent polymer film incorporating photodiodes or fluorescent/wavelength-specific particles configured to capture incoming light of a specific wavelength and, e.g., re-emit the captured light at a slightly different wavelength. This captured and re-emitted light may be conducted through the LC layer to arrays of optical sensors 134 positioned around the outer edges of the transparent image sensor 114c. The processing resource 116 (FIG. 1) may collect information from the optical sensors 134 to determine, for example, at which precise points light strikes the surface of the LC 132, and thereby reconstruct the image stream 112 passing through the transparent image sensor 114c.

Figure 3:
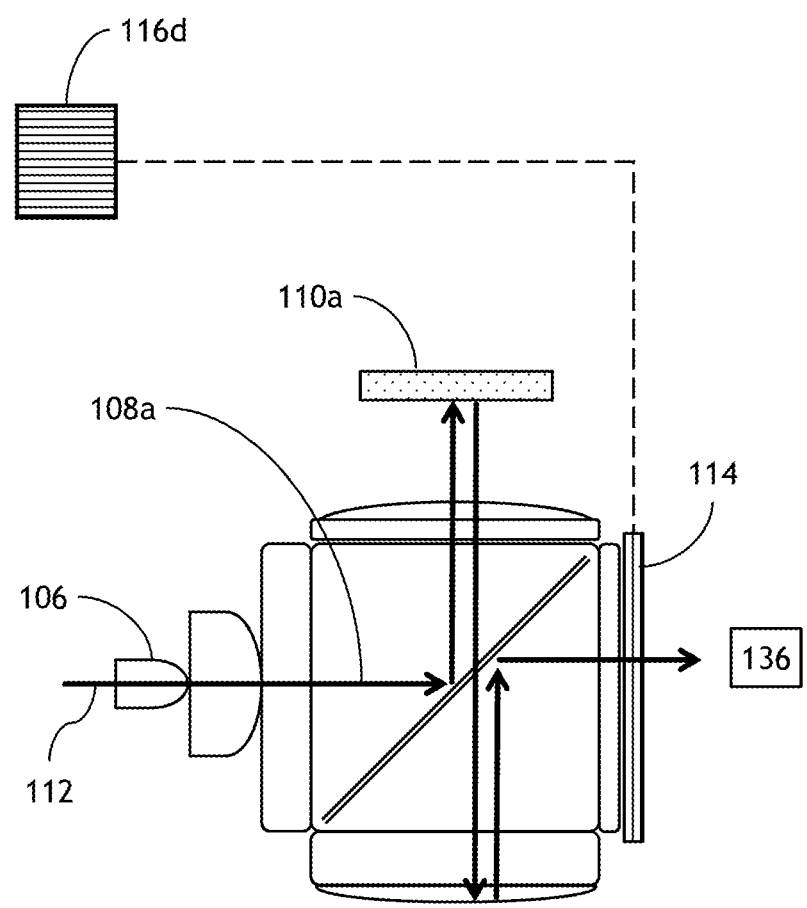
FIG. 3 illustrates an exemplary embodiment of a head-worn device (HWD) of the system of FIG. 1.

Referring to FIG. 3, a compact microcollimator 108b may be implemented and may function similarly to the collimating optics 108 of FIG. 1, except that the compact microcollimator 108b may be implemented in a HWD wearable by a pilot or crewmember as a helmet or goggles, or in a fixed HUD. The compact microcollimator 108b may incorporate a microdisplay surface 110a proximate to the pilot's eye to which the image stream 112 may be directed from the display module 106. The compact microcollimator 108b may include one or more transparent photodetectors 114 positioned proximate to the projecting waveguide 136 terminating the optical path 108a. The compact microcollimator 108b may handle process monitoring of the transparent photodetectors 114 via an embedded or reduced instruction set computing (RISC) processor, or a processor 116d wirelessly linked to the compact microcollimator 108b.

Figure 4:
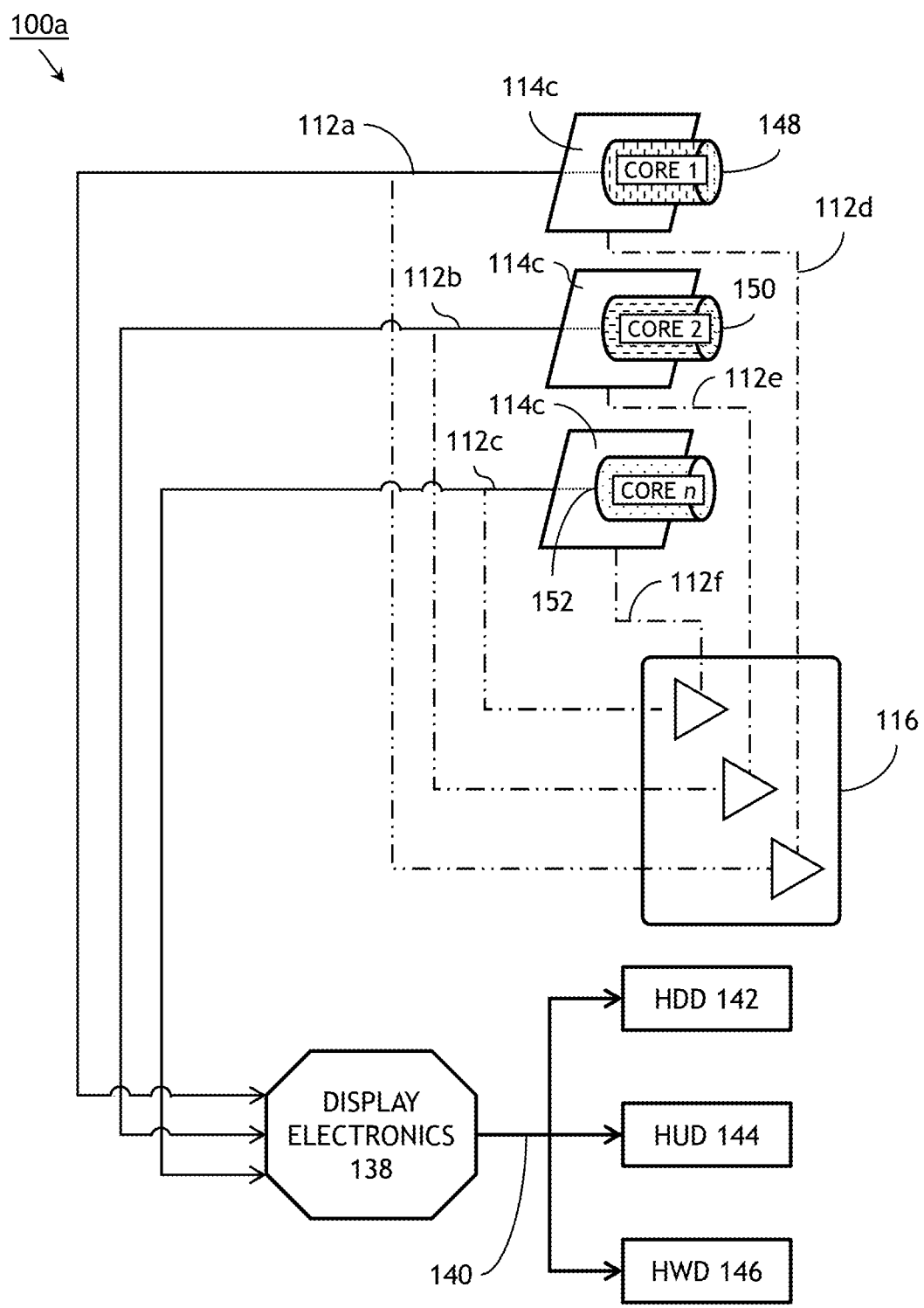
FIG. 4 illustrates an exemplary embodiment of an enhanced vision system (EVS) according to the inventive concepts disclosed herein.

Referring to FIG. 4, an enhanced vision system (EVS) 100a may be implemented and may function similarly to the system 100 of FIG. 1, except that the EVS 100b may combine, via display electronics 138, multiple visual channels (image streams 112a-c) into a comprehensive visual stream 140 for display (by, e.g., a HDD 142, a HUD 144, or a HWD 146). For example, the comprehensive visual stream 140 may represent a singular field of view (FoV) as rendered in varied spectral bands, whereby each individual image stream 112a-c presents distinct scene content corresponding to the FoV. The individual image streams 112a-c must be precisely aligned or the comprehensive visual stream 140 may present a hazardously misleading or incoherent image. The EVS 100b may include multiple camera cores 148, 150, 152; even within a single EVS each camera core may be produced by a different vendor and would otherwise require a distinct and complex conventional monitoring solution.

In addition to the orientation, refresh, brightness, and symbology monitoring discussed above, a particular challenge with respect to monitoring the alignment of COTS camera cores 148, 150, 152 of the EVS 100b is the lack of a known image or image characteristic with which to compare the camera core output (image streams 112a-c). The EVS 100b may address this challenge by positioning a transparent image sensor 114c in line with each camera core 148, 150, 152 to capture relevant scene content (112d-f) similar to the image streams 112a-c generated by each camera core. The processing monitor 116 may then compare the characteristics of each individual image stream 112a-c with its independently captured scene-content counterpart 112d-f to verify image stream alignment.

Figure 5:
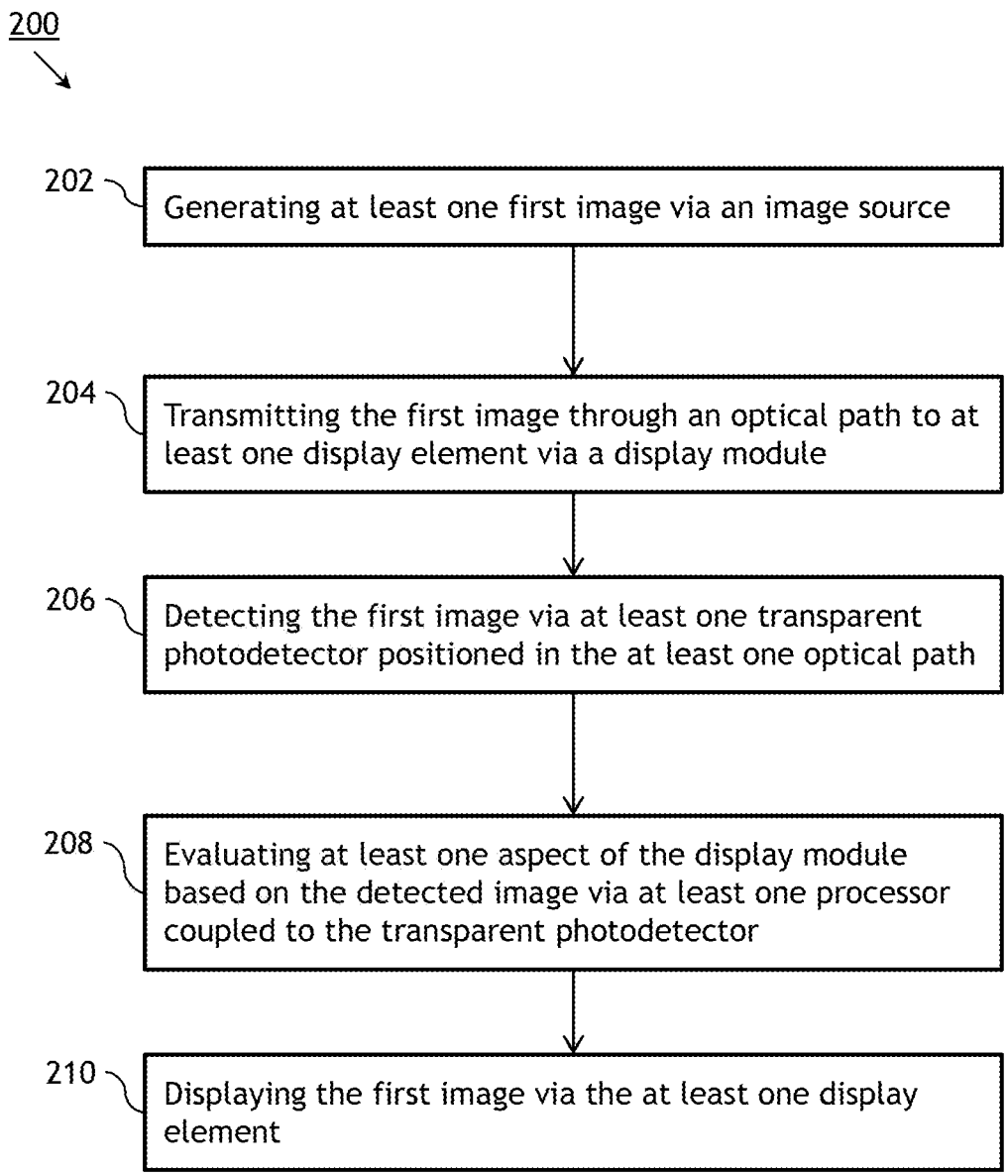
FIG. 5 illustrates an exemplary embodiment of a method for monitoring COTS display devices according to the inventive concepts disclosed herein.

Referring now to FIG. 5, an exemplary embodiment of a method 200 for monitoring COTS display devices according to the inventive concepts disclosed herein may be implemented by the avionics display system 100, and may include one or more of the following steps. At a step 202, an image source or camera core of the system generates an image stream for display. The image stream may be a combined image stream including symbology generated by a graphics processor or SVS of the system and merged into the image stream. The system may be an EVS wherein multiple image streams are generated by multiple camera cores of the EVS, each image stream associated with one or more particular spectral bands.

At a step 204, the generated image stream is transmitted by a COTS display module through an optical path defined by collimating optics to a combiner or display element.

At a step 206, the generated image stream is detected via transparent photodetectors positioned in the optical path. The system may include transparent image sensors positioned in the optical path, configured to generate scene content or secondary images for verifying the integrity of the generated image stream. The system may detect wavelength-specific imagery associated with one or more nonvisible bands (e.g., NIR) generated by wavelength-specific image sources via wavelength-specific transparent photodetectors positioned in the optical path.

At a step 208, aspects of the display module are evaluated based on the detected image stream via a processing monitor connected to the transparent photodetector. The processing monitor may compare the detected image stream to the scene content or secondary images generated by the transparent image sensors.

At a step 210, the generated image stream is displayed via the combiner or display surface. The generated image stream may be displayed by a HDD, a HUD, or a HWD.

As will be appreciated from the above, systems and methods according to embodiments of the inventive concepts disclosed herein may enable the use of low-SWaP-C COTS display devices in avionics display systems (as opposed to high-cost custom-designed devices) by providing a similarly low-SWaP-C means of monitoring the COTS display devices and ensuring that the COTS display devices are compliant with aviation hazard classifications.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A system for monitoring display devices in an avionics display system, comprising:
at least one image source configured to generate at least one image stream;
at least one graphics processor configured to generate at least one symbol for merging with the at least one image stream;
at least one display element configured to display the at least one image stream;
collimating optics defining an optical path of the at least one image stream from the at least one image source to the at least one display element;
at least one transparent photodetector positioned in the optical path proximate to the display element, disposed between the display element and a user, the transparent photodetector configured to detect one or more first control features associated with the at least one image stream; and
at least one monitor processor coupled to the transparent photodetector and to the image source, the at least one processor configured to:
generate one or more second control features associated with the at least one image stream; and
monitor the at least one display element by comparing the one or more first control features to the one or more second control features.

2. The system of claim 1, wherein the one or more first control features and the one or more second control features include at least one of:
a brightness level;
a refresh rate;
an image orientation;
a wavelength specific feature;
an all white all bright (AWAB) condition; and
a positioning of the at least one symbol.

3. The system of claim 1, wherein:
the at least one image source includes at least one wavelength-specific image source positioned in the optical path proximate to the transparent photodetector; and
the at least one image stream includes at least one image corresponding to one or more nonvisible spectral bands.

4. The system of claim 2, wherein the at least one monitor processor includes a phased processor configured to monitor the at least one refresh rate by generating at least one refresh pattern.

5. The system of claim 1, wherein:
the at least one display element includes at least one emissive display comprising at least a display surface and a plurality of emissive devices; and
the at least one transparent photodetector is positioned between the display surface and at least one emissive device of the plurality of emissive devices.

6. The system of claim 1, wherein:
the at least one transparent photodetector includes one or more photosensitive materials fixed between a first substrate and a second substrate, the one or more photosensitive materials include at least one of a nanotube, a luminescent concentrator, a fluorescent particle, a photosensitive dye, and a quantum dot; and
one or more of the first substrate and the second substrate is fashioned of at least one of conductive glass and polymer film.

7. The system of claim 1, wherein the system is embodied in at least one of a head-up display (HUD) system and a head-worn display (HWD) system.

8. The system of claim 7, wherein the at least one monitor processor includes at least one of:
an embedded processor; and
a processor wirelessly linked to at least one of the HUD system and the HWD system.

9. A system for monitoring display devices in an enhanced vision system (EVS), comprising:
two or more camera cores, each camera core coupled to one or more electromagnetic (EM) sensors configured to detect EM radiation in one or more EM spectral bands, each camera core configured to generate a component image stream associated with the one or more EM spectral bands;

at least one transparent image sensor positioned proximate to each camera core, disposed between the camera core and a user, each transparent image sensor configured to capture first image content associated with the corresponding component image stream;

at least one monitor processor coupled to the at least one transparent image sensor and to the two or more camera cores, the processing monitor processor configured to:
  capture second image content associated with each component image stream; and
  evaluate an alignment of the at least one component image stream by comparing the first image content to the corresponding second image;

display electronics coupled to the two or more camera cores and configured to generate at least one combined image stream by combining the two or more component image streams; and at least one display element coupled to the display electronics, the display element configured to display the at least one combined image stream.

10. The system of claim 9, wherein the two or more camera cores include at least one of:
  a first camera core associated with one or more first aircraft-based EM sensors corresponding to a first spectral band of the one or more EM spectral bands; and
  a second camera core associated with one or more second aircraft-based EM sensors corresponding to a second spectral band of the one or more EM spectral bands.

11. The system of claim 9, wherein the display element includes at least one of a HUD and a HWD.

12. A method for monitoring display devices of an avionics display system, the method comprising:
  generating at least one first image stream via an image source;
  transmitting the first image stream through an optical path to at least one display element via collimating optics;
  detecting at least one first control feature associated with the first image stream via at least one transparent photodetector positioned in the at least one optical path, between the display element and a user;
  generating at least one second control feature associated with the first image stream via at least one monitor processor coupled to the image source;
  evaluating at least one aspect of the display module by comparing the at least one first control feature and the at least one second control feature via the at least one monitor processor; and
  displaying the first image stream via the at least one display element.

13. The method of claim 12, wherein generating at least one first image stream via an image source includes:

generating at least one symbol corresponding to the first image stream; and
merging the at least one first image stream with the at least one symbol via a graphics processor.

14. The method of claim 12, wherein evaluating at least one aspect of the display module based on the detected image via at least one processor coupled to the transparent photodetector includes:
  detecting at least one first control feature associated with the first image stream via at least one transparent photodetector positioned in the at least one optical path includes detecting at least one of a first brightness level, a first refresh rate, a first image orientation, a first wavelength specific feature, and a first symbol positioning via at least one processor coupled to the transparent photodetector; and
  generating at least one second control feature associated with the first image stream via at least one monitor processor coupled to the image source includes generating at least one of a second brightness level, a second refresh rate, a second image orientation, a second wavelength specific feature, and a second symbol positioning via the at least one monitor processor.

15. The method of claim 12, wherein displaying the first image stream via the at least one display element includes:
  displaying the first image stream via at least one of a head-up display (HUD) and a head-worn display (HWD).

16. The method of claim 12, wherein the at least one first image stream is a first component image stream of two or more component image streams of a combined image stream, each component image stream associated with one or more electromagnetic (EM) spectral bands.

17. The method of claim 16, wherein:
  detecting at least one first control feature associated with the first image stream via at least one transparent photodetector positioned in the at least one optical path includes 1) detecting first image content associated with the first component image stream and 2) detecting second image content associated with at least one second component image stream; and
  evaluating at least one aspect of the display module by comparing the at least one first control feature and the at least one second control feature via the at least one monitor processor includes evaluating an alignment of at least one of the first component image stream and the at least one second component image stream by comparing the at least one second control feature to one or more of the corresponding first image content and the corresponding second image content.

18. The method of claim 15, wherein displaying the first image stream via the at least one display element includes:
  displaying the combined image stream via the at least one display element.

* * * * *